United States Patent
Courson et al.

(10) Patent No.: US 9,647,430 B1
(45) Date of Patent: May 9, 2017

(54) LOAD CENTER, AND BUS ASSEMBLY AND OPERATING METHOD THEREFOR

(71) Applicant: EATON CORPORATION, Cleveland, OH (US)

(72) Inventors: Andrew William Courson, McGrann, PA (US); Jason Kohei Okerman, Pittsburgh, PA (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 15/041,352

(22) Filed: Feb. 11, 2016

(51) Int. Cl.
*H02B 1/20* (2006.01)

(52) U.S. Cl.
CPC ..................... *H02B 1/20* (2013.01)

(58) Field of Classification Search
CPC . H02B 1/20; H02B 1/24; H02B 1/044; H02B 1/048; H02B 1/056; H02B 13/025; H02G 5/00; H02H 7/22
USPC ................. 361/600–660; 174/99 B; 307/125
See application file for complete search history.

(56) References Cited

U.S. PATENT DOCUMENTS

| | | | | |
|---|---|---|---|---|
| 4,472,761 A * | 9/1984 | Koslosky | ................. | H02B 1/21 361/638 |
| 5,272,592 A * | 12/1993 | Harris | ...................... | H02B 1/20 361/637 |
| 6,459,570 B1 * | 10/2002 | Buchanan | .............. | H01R 9/223 174/166 R |
| 6,813,142 B1 | 11/2004 | Seff | | |
| 7,372,692 B2 * | 5/2008 | Ranta | ...................... | H02B 1/056 361/624 |
| 7,553,175 B1 * | 6/2009 | Benson | .................. | H02B 1/056 361/637 |
| 7,830,648 B2 * | 11/2010 | Strong | ...................... | H02B 1/20 174/40 R |
| 8,395,885 B2 * | 3/2013 | Maloney | ................ | H02B 1/056 361/627 |
| 8,968,039 B1 * | 3/2015 | Whipple | .............. | H01R 9/2408 439/814 |
| 2007/0133152 A1 * | 6/2007 | Karim | .................... | H02B 1/042 361/647 |
| 2014/0185195 A1 * | 7/2014 | Samuelson | ............ | H02B 1/056 361/634 |
| 2015/0064949 A1 * | 3/2015 | Rahn | ........................ | H02B 1/04 439/212 |

(Continued)

*Primary Examiner* — Anthony Haughton
*Assistant Examiner* — Yahya Ahmad
(74) *Attorney, Agent, or Firm* — Eckert Seamans; John Powers; Grant Coffield

(57) ABSTRACT

A bus assembly is for a load center. The load center includes a cover apparatus and an electrical switching apparatus. The cover apparatus has a number of cover segments. The bus assembly comprises a bus stab structured to be coupled to the number of cover segments and the electrical switching apparatus; a bus bar structured to be coupled to the number of cover segments; and a connection device comprising an element extending from a corresponding one of the bus stab and the bus bar. The connection device is structured to move between a FIRST position corresponding to the element being electrically disconnected from the other of the corresponding one of the bus stab and the bus bar, and a SECOND position corresponding to the element being electrically connected to the other of the corresponding one of the bus stab and the bus bar.

20 Claims, 7 Drawing Sheets

(56) References Cited

U.S. PATENT DOCUMENTS

2016/0172825 A1\* 6/2016 Ranta .................... H02B 1/056
　　　　　　　　　　　　　　　　　　　　200/293

\* cited by examiner

LOAD CENTER, AND BUS ASSEMBLY AND OPERATING METHOD THEREFOR

BACKGROUND

Field

The disclosed concept relates generally to load centers including electrical switching apparatus such as, for example, circuit breakers. The disclosed concept further relates to bus assemblies for load centers. The disclosed concept further relates to methods of operating a load center.

Background

Electrical enclosures, such as, for example, load centers, typically include a number of electrical switching apparatus or electrical meters. The load center is typically coupled to and supported by a structure such as, for example, a wall of a building, and includes a number of electrical bus members. Residential load centers, for example, include a number of electrical bus members having a plurality of elongated bus stabs extending outwardly therefrom. Typically, a plurality of circuit breakers or other suitable electrical switching apparatus are mechanically coupled and electrically connected to the elongated bus stabs and, in turn, to the electrical bus members within the electrical enclosure.

In known load centers, there is nothing to prevent the circuit breakers from being removed, live, while carrying rated current. Removing the circuit breakers while under a load and live can cause an arc to result in open air and potentially in close proximity to the face and hands of an operator performing maintenance. One known method to address this issue is to de-energize a main circuit breaker in the load center. However, de-energizing the main circuit breaker is inconvenient and inefficient in that all of the branch circuit breakers are in turn de-energized. But if the main circuit breaker is not disconnected and a branch circuit breaker is removed, significant energized metal, including bus stabs, can become undesirably exposed, thereby presenting an electrical hazard.

There is thus room for improvement in load centers, and in bus assemblies and operating methods therefor.

SUMMARY

These needs and others are met by the embodiments of the disclosed concept, which are directed to a load center, and bus assembly and operating method therefor in which a bus stab is structured to be energized and de-energized by a connection device.

In accordance with one aspect of the disclosed concept, a bus assembly for a load center is provided. The load center includes a cover apparatus and an electrical switching apparatus. The cover apparatus has a number of cover segments. The bus assembly comprises a bus stab structured to be coupled to the number of cover segments and the electrical switching apparatus; a bus bar structured to be coupled to the number of cover segments; and a connection device comprising an element extending from a corresponding one of the bus stab and the bus bar. The connection device is structured to move between a FIRST position corresponding to the element being electrically disconnected from the other of the corresponding one of the bus stab and the bus bar, and a SECOND position corresponding to the element being electrically connected to the other of the corresponding one of the bus stab and the bus bar. The bus stab is de-energized when the connection device is in the FIRST position and is energized when the connection device is in the SECOND position.

As another aspect of the disclosed concept, a load center comprises a cover apparatus comprising a number of cover segments; at least one electrical switching apparatus; and a bus assembly comprising at least one bus stab coupled to the number of cover segments and structured to be coupled to the electrical switching apparatus, at least one bus bar coupled to the number of cover segments, and at least one connection device comprising an element extending from a corresponding one of the bus stab and the bus bar. The connection device is structured to move between a FIRST position corresponding to the element being electrically disconnected from the other of the corresponding one of the bus stab and the bus bar, and a SECOND position corresponding to the element being electrically connected to the other of the corresponding one of the bus stab and the bus bar. The bus stab is de-energized when the connection device is in the FIRST position and is energized when the connection device is in the SECOND position.

As another aspect of the disclosed concept, a method of operating a load center is provided. The load center comprises a cover apparatus comprising a number of cover segments; at least one electrical switching apparatus; and a bus assembly comprising at least one bus stab coupled to the number of cover segments, at least one bus bar coupled to the number of cover segments, and at least one connection device comprising an element extending from a corresponding one of the bus stab and the bus bar. The method comprises the steps of moving the electrical switching apparatus between a FIRST position corresponding to disengagement with the bus stab, and a SECOND position corresponding to engagement with the bus stab; and either engaging the element with the other of the corresponding one of the bus stab and the bus bar when the electrical switching apparatus moves from the FIRST position to the SECOND position, thereby energizing the bus stab; or disengaging the element from the other of the corresponding one of the bus stab and the bus bar when the electrical switching apparatus moves from the SECOND position to the FIRST position, thereby de-energizing the bus stab.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts exert a force against one another either directly or through one or more intermediate parts or components.

Figure 1:
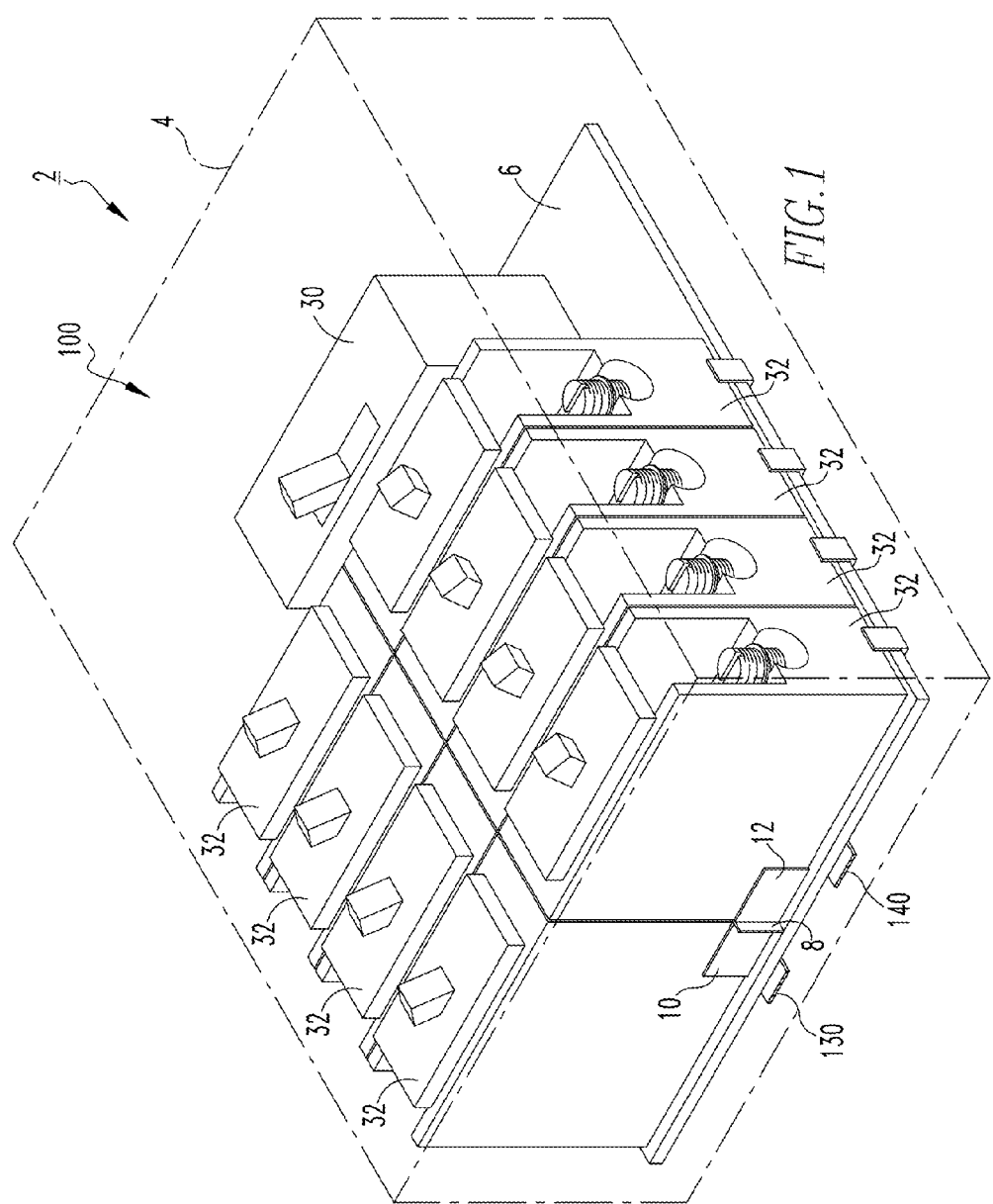
FIG. 1 is a simplified view of a load center and bus assembly therefor, and shown with a housing in phantom line drawing, in accordance with a non-limiting embodiment of the disclosed concept.

FIG. 1 shows a simplified view of a load center 2, in accordance with a non-limiting embodiment of the disclosed concept. The example load center 2 includes a housing 4 (shown in simplified form in phantom line drawing), a cover apparatus, a main electrical switching apparatus (e.g., without limitation, main circuit breaker 30), and a plurality of branch electrical switching apparatus (e.g., without limitation, branch circuit breakers 32). The main circuit breaker 30 closes and opens each of the branch circuit breakers 32 in a generally well known manner. The load center 2 also includes a novel bus assembly 100 that advantageously protects operating personnel who are performing maintenance on or are otherwise accessing the load center 2. The bus assembly 100 includes a number of bus stabs 110,120 each coupled to a corresponding one of the branch circuit breakers 32 in operation, and a number of bus bars 130,140. The bus stabs 110,120 and the bus bars 130,140 are each spaced from one another.

As will be discussed in greater detail hereinbelow, the bus assembly 100 provides a mechanism to de-energize and energize the bus stabs 110,120 when each of the corresponding branch circuit breakers 32 are removed and installed, respectively. In this manner, when one of the branch circuit breakers 32 is removed, a corresponding one of the bus stabs 110,120 will be de-energized, thereby protecting any nearby operating personnel from potential exposure to dangerous electrical energies of the corresponding bus stab 110,120. As such, rather than having to de-energize the entire load center 2 by way of switching the main circuit breaker 30 to an OFF position, the novel bus assembly 100 allows the load center 2, apart from a respective one of the bus stabs 110,120, to continue to function live while safely allowing the individual branch circuit breakers 32 to be removed/installed, thereby saving time and money. This is distinct from prior art load centers (not shown) in which removal of one branch circuit breaker results in an energized/exposed bus stab that could potentially injure an operator working nearby, and in which safely accessing one of the branch circuit breakers 32 generally requires de-energizing the entire load center by way of switching the main circuit breaker off, a time consuming and expensive process.

Figure 2:
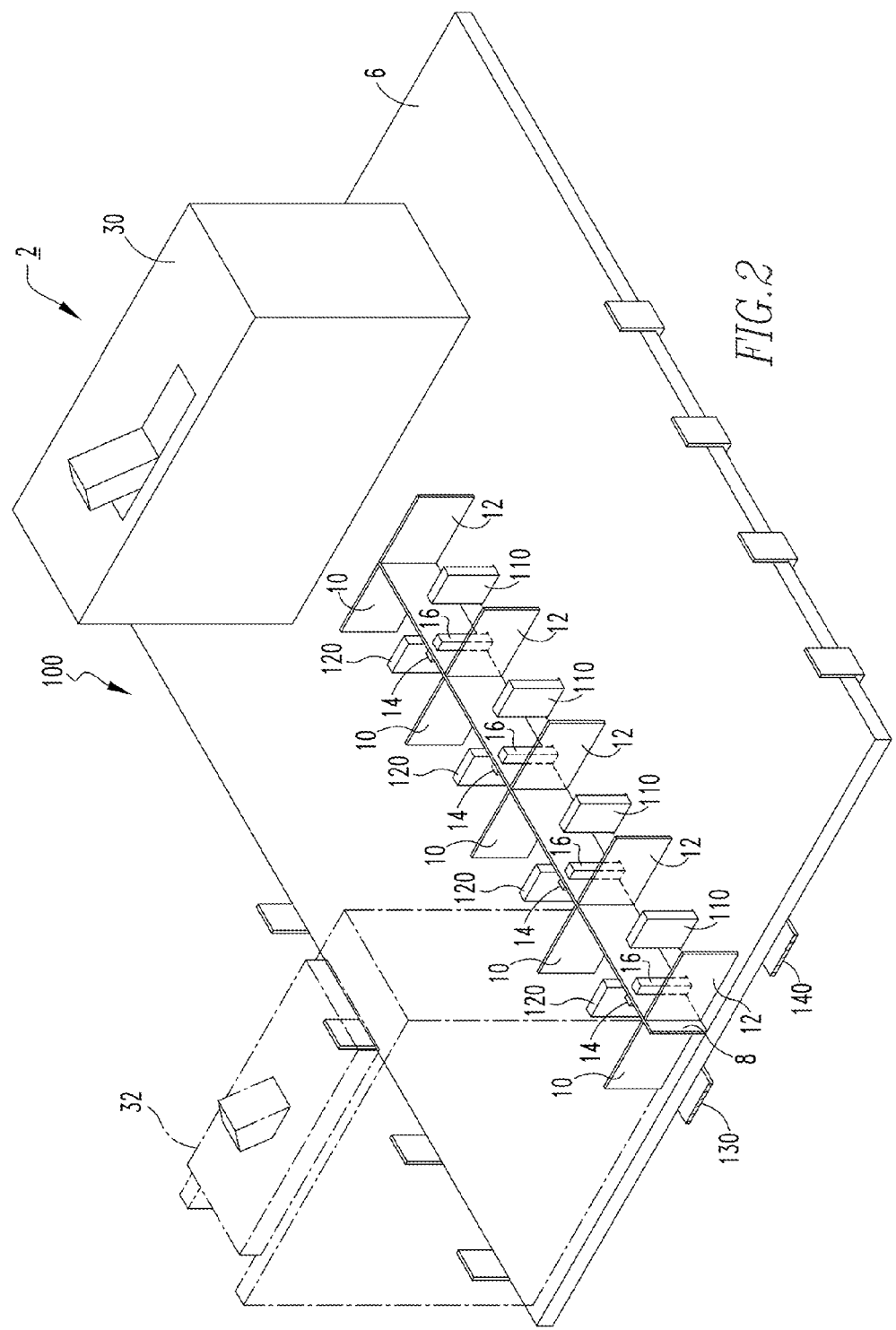
FIG. 2 is a simplified view of the load center and bus assembly therefor of FIG. 1, and shown with a number of electrical switching apparatus removed and one electrical switching apparatus in phantom line drawing in order to see hidden structures.

FIG. 2 shows the load center 2 with only one of the branch circuit breakers 32 shown in simplified form in phantom line drawing. The cover apparatus is in the form of a number of cover segments (e.g., without limitation, planar segments 6,8,10,12 and directing segments 14,16) that are coupled to the bus stabs 110,120 and the bus bars 130,140. The planar segments 6,8,10,12 isolate each of the branch circuit breakers 32 from each other and the bus bars 130,140, and isolate the bus stabs 110,120 from each other. In the example embodiment, the planar segment 8 extends longitudinally between and separates the bus stabs 110 from the bus stabs 120. The planar segments 10,12 extend from the central planar segment 8 in opposing directions and are each located between and separate adjacent bus stabs 110,120 within the same column. In this manner, when each of the branch circuit breakers 32 is installed in the load center 2, the planar segments 8,10,12 advantageously isolate the branch circuit breakers 32 from each other.

Furthermore, the planar segment 6 advantageously protects operating personnel from inadvertent exposure to the live/energized bus bars 130,140. More specifically, as shown in FIG. 2, the planar segment 6 is located between the bus bars 130,140 and the planar segments 8,10,12 (i.e., and the branch circuit breakers 32). Furthermore, the bus stabs 110,120 extend through and are coupled to the planar segment 6. In one example embodiment, the planar segments 6,8,10,12 and the directing segments 14,16 are a single unitary component made from a single piece of material (e.g., without limitation, an injection molded piece). In another example embodiment, the planar segments 6,8,10,12 and the directing segments 14,16 are coupled together by way of slot connections wherein the directing segments 14,16 are able to slide with respect to the planar segment 8.

Figure 3:
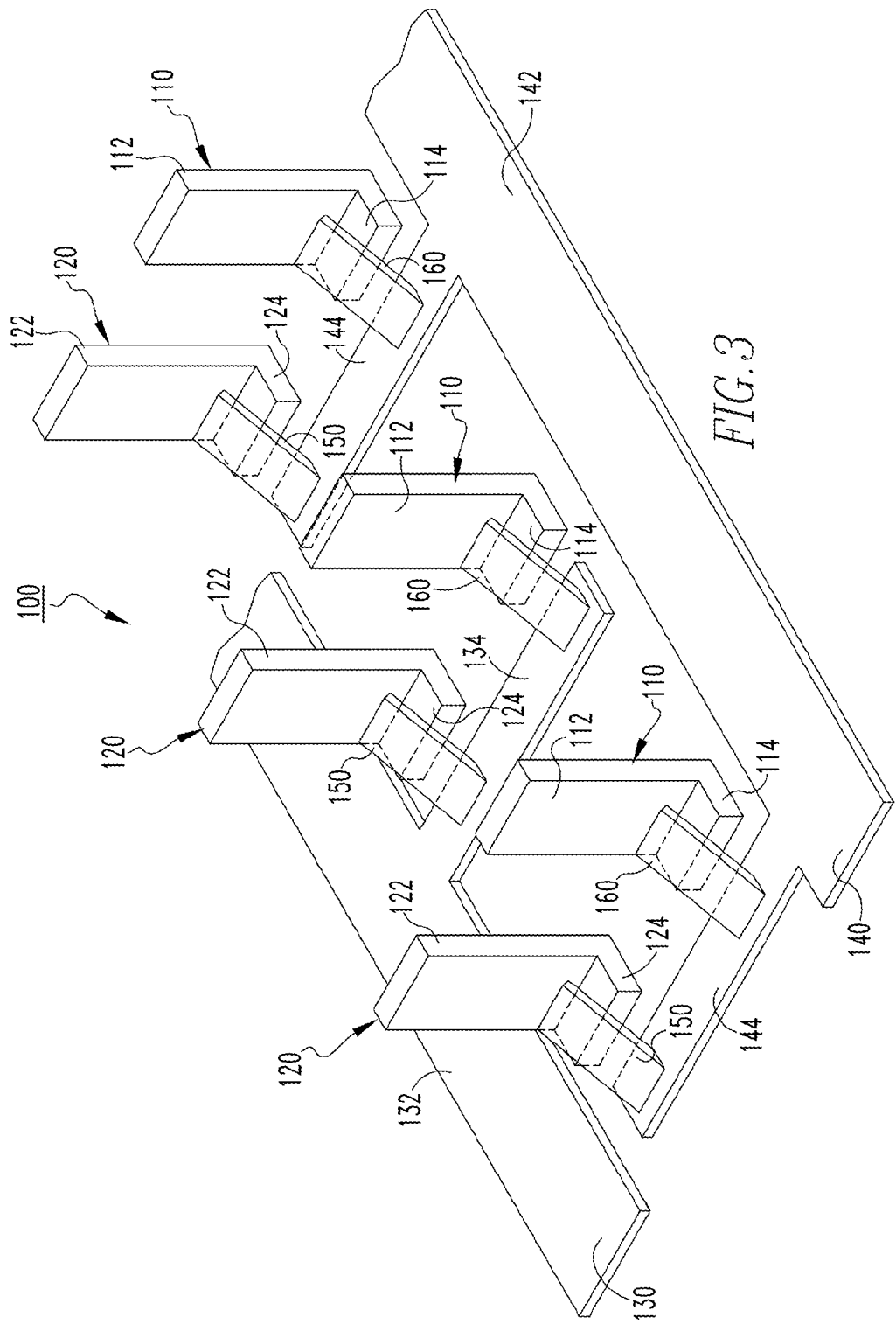
FIG. 3 is a simplified view of a portion of the bus assembly of FIG. 2.

FIG. 3 shows an isometric view of a portion of the bus assembly 100. In the example embodiment, the bus stabs 110,120 each include a first portion (e.g., without limitation, breaker portions 112,122) and a second portion (e.g., without limitation, switching portions 114,124) extending from and being perpendicular to the respective breaker portions 112,122. The bus bars 130,140 each include a corresponding longitudinal portion 132,142 and a corresponding number of extension portions 134,144 extending from and being perpendicular to the longitudinal portions 132,142. As will be discussed in greater detail below, the bus assembly 100 further includes a number of connection devices that advantageously allow the bus stabs 110,120 to be energized and de-energized responsive to installation and removal of the branch circuit breakers 32, respectively.

Figure 4:
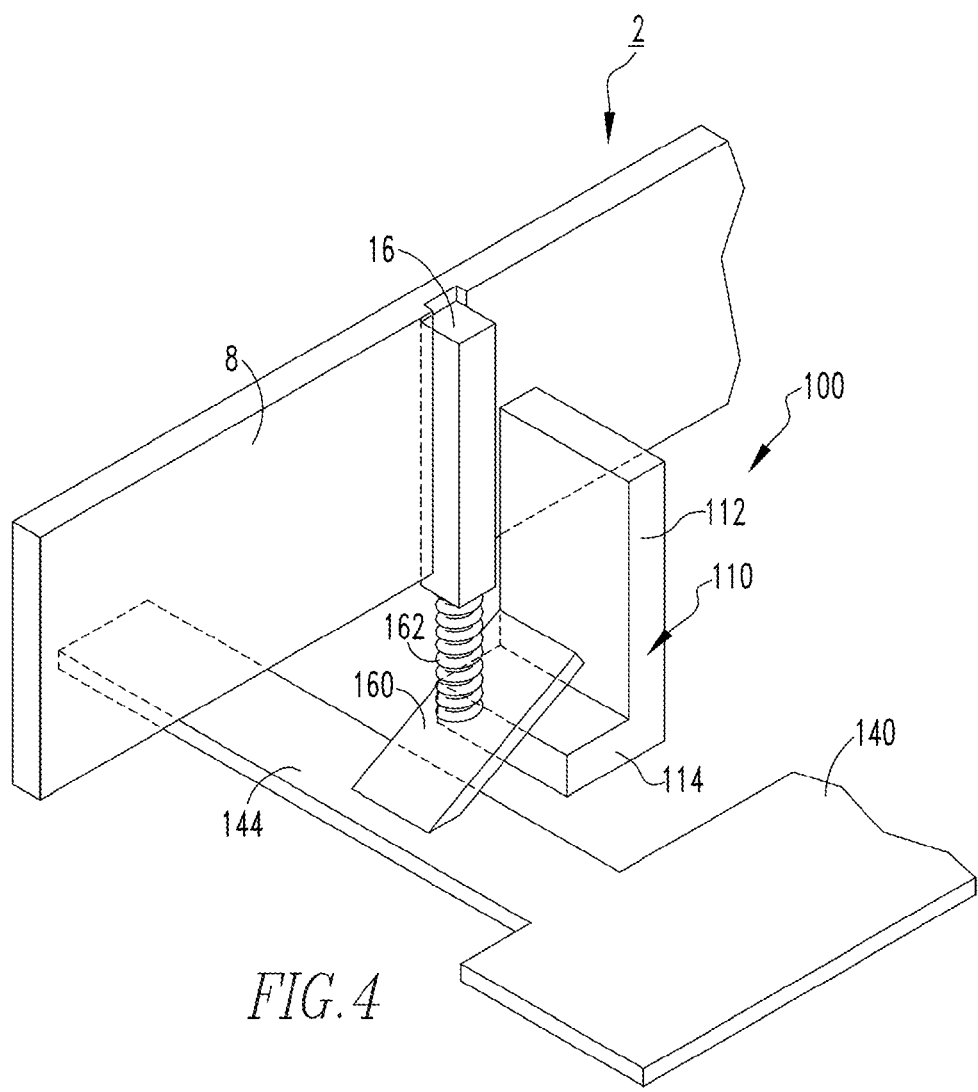
FIG. 4 is a simplified view of a portion of the load center and bus assembly therefor of FIG. 2, and shown with a connection device in a FIRST position.
Figure 5:
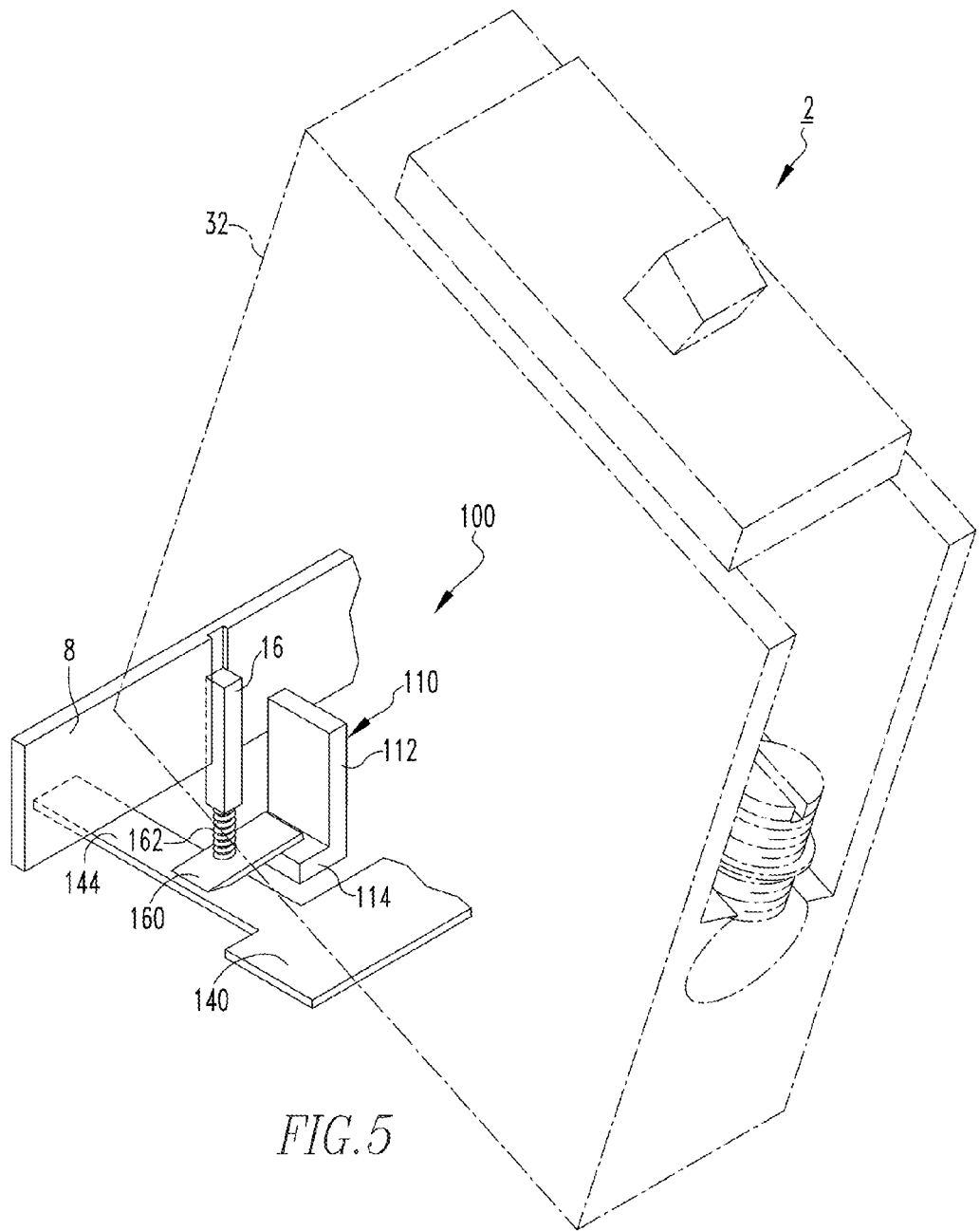
FIG. 5 is a simplified view of the portion of the load center and bus assembly therefor of FIG. 4, shown with the connection device in a SECOND position, and shown with an electrical switching apparatus in simplified form in a FIRST position.
Figure 6:
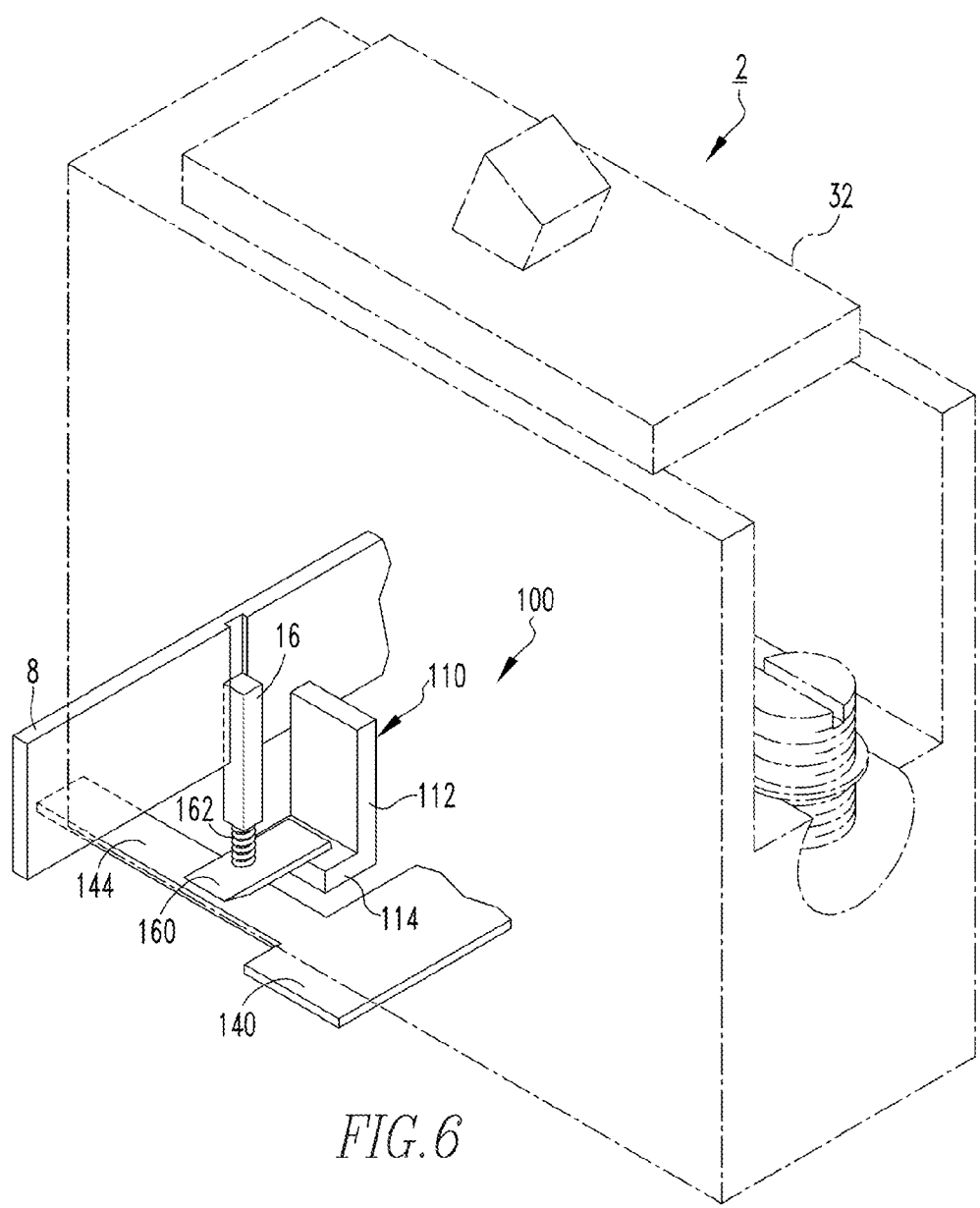
FIG. 6 is a simplified view of the portion of the load center and bus assembly therefor of FIG. 5, and shown with the electrical switching apparatus in a SECOND position.

In the example embodiment, the connection devices are in the form of a generally flexible conductive element 150,160 extending from a respective one of the extension portions 134,144, and a biasing member (see, for example, spring 162 shown in FIGS. 4-6) coupled to each respective element 150,160 and each respective directing segment 14,16. In one example embodiment, the conductive elements 150,160 and each of the respective bus stabs 110,120 are a single unitary component. It is also within the scope of the disclosed concept to have conductive elements (not shown) be separate components that are connected to the bus bars by any known joining method (e.g., without limitation, welding). The connection devices are structured to move between a FIRST position corresponding to the respective conductive elements 150,160 being electrically disconnected from the respective switching portions 114,124, as shown in FIGS. 3 and 4, and a SECOND position corresponding to the respective conductive elements 150,160 being electrically connected to the respective switching portions 114,124, as shown in FIGS. 5 and 6. Although the disclosed concept being discussed herein relates to connection devices in the form of the conductive elements 150,160 and the springs 162, it will be appreciated that a similar suitable alternative load center may employ any known or suitable alternative connection device that performs the desired function of de-energizing and energizing a respective number of bus stabs responsive to removal and installation, respectively, of a respective number of branch circuit breakers.

It will be understood with reference to FIG. 4 that when the connection device is in the FIRST position, the conductive element 160 is spaced from (i.e., does not engage) the switching portion 114. In this manner, the bus stab 110 is de-energized when the connection device is in the FIRST position. That is, when the connection device is in the FIRST position, the live and energized bus bar 140, which is spaced from the bus stab 110, is not able to energize the bus stab. In accordance with the disclosed concept, the connection device moves to the SECOND position, in which the bus stab 110 is energized, by installing a respective one of the branch circuit breakers 32. As such, it will be understood that the spring 162 biases the connection device toward the FIRST.

FIG. 5 shows a portion of the load center 2, with a respective connection device in the SECOND position, and with a respective one of the branch circuit breakers 32 (shown in simplified form in phantom line drawing) partially installed in the load center 2. As shown, the conductive element 160 is engaging the switching portion 114. It will be appreciated that, when being installed (i.e., rotated) in the load center 2, the branch circuit breaker 32 initially engages and pushes the directing segment 16 down, with respect to the orientation of FIG. 5. As such, the directing segments 14,16 in the example shown and described herein are each slidably coupled to the planar segment 8. As a result of engagement with the branch circuit breaker 32, the directing segment 16 causes the spring 162 to press the conductive element 160 into engagement with the switching portion 114, thereby energizing the bus stab 110.

In the position shown in FIGS. 4 and 5, the branch circuit breaker 32 is in a FIRST position corresponding to disengagement from the breaker portion 112 of the bus stab 110. Continued rotation of the branch circuit breaker 32 results in the branch circuit breaker 32 moving to a SECOND position corresponding to engagement with the breaker portion 112, as shown in FIG. 6. Accordingly, the connection device provides a mechanism to safely de-energize and energize the bus stab 110, thereby allowing operating personnel to install and remove the branch circuit breakers 32 without having to switch the main circuit breaker 30 off or be exposed to potentially energized electrical equipment (e.g., the bus stabs 110,120). As such, when the branch circuit breaker 32 is removed from the load center 2 (i.e., rotated off of the breaker portion 112), the branch circuit breaker 32 first moves from the SECOND position (FIG. 6) to the FIRST position shown in FIG. 5. Continued rotation results in the branch circuit breaker 32 moving away from the directing segment 16, which allows the spring 162 to pull the conductive element 160 out of engagement with the switching portion 114, thereby de-energizing the bus stab 110. In other words, when the branch circuit breaker moves from the SECOND position (FIG. 6) to the FIRST position shown in FIG. 4, the conductive element 160 disengages the bus stab 110 after the branch circuit breaker 32 disengages the bus stab 110.

Conversely, when the branch circuit breaker 32 moves from the FIRST position shown in FIG. 4 toward the SECOND position (FIG. 6) (i.e., installation of the branch circuit breaker 32), the branch circuit breaker 32 first pushes the directing segment 16 toward the conductive element 160, thereby causing the respective connection device to move from the FIRST position to the SECOND position. This involves first moving the conductive element 160 into engagement with the switching portion 114 in order to energize the bus stab 110, and second moving the branch circuit breaker 32 to the SECOND position (FIG. 6) into engagement with the breaker portion 112. In other words, when the branch circuit breaker moves from the FIRST position shown in FIG. 4 to the SECOND position (FIG. 6), the conductive element 160 engages the bus stab 110 before the branch circuit breaker 32 engages the bus stab 110. Thus, the sequencing of connection and disconnection advantageously protects the connection devices.

More specifically, when the branch circuit breaker 32 disengages the bus stab 110, the resulting disconnection stops the flow of electrical current. As a result, the subsequent disengagement between the conductive element 160 and the switching portion 114 occurs with no current flowing. Conversely, when the branch circuit breaker is installed in the load center, the conductive element 160 moves into engagement with the switching portion 114 with no current flowing. The subsequent engagement between the branch circuit breaker 32 and the bus stab 110 completes an electrical circuit. As such, the making and breaking of electrical connection occurs at the branch circuit breaker 32 and the bus stab 110 interface. In this manner, the conductive elements 150,160 are advantageously well protected from degradation associated with electrical connection and disconnection, and thus generally only need to be able to carry rated current rather than be able to make and break electrical connections. Accordingly, the bus assembly 100 provides a novel mechanism to ensure that operators can safely access the individual branch circuit breakers 32 without having to turn off the main circuit breaker 30. In other words, removal of any one of the branch circuit breakers 32 results in the respective bus stab 110,120 being de-energized. In this position, the bus stabs 110,120 pose no significant danger to operating personnel, and the load center 2 still allows each of the other branch circuit breakers 32 to continue to function.

It will be appreciated that a method of operating the load center 2 includes the steps of moving the branch circuit breakers 32 between a FIRST position corresponding to disengagement with the bus stabs 110,120, and a SECOND position corresponding to engagement with the bus stabs 110,120, and either engaging the conductive elements 150, 160 with the bus stabs 110,120 when the branch circuit breakers 32 move from the FIRST position to the SECOND position, thereby energizing the bus stabs 110,120, or disengaging the conductive elements 150,160 from the bus stabs 110,120 when the branch circuit breakers 32 move from the SECOND position to the FIRST position, thereby de-energizing the bus stabs 110,120. The method further includes moving the branch circuit breakers 32 into engagement with the directing segments 14,16 when the branch circuit breakers 32 move from the FIRST position toward the SECOND position, thereby causing the directing segments 14,16 and the springs 162 to push the conductive elements 150,160 into engagement with the bus stabs 110, 120. The method also includes the step of moving the branch circuit breakers 32 into engagement with the bus stabs 110,120 after the conductive elements 150,160 move into engagement with the bus stabs 110,120 when the branch circuit breakers 32 move from the FIRST position toward the SECOND position. The method also includes the step of moving the branch circuit breakers 32 out of engagement with the directing segments 14,16 when the branch circuit breakers 32 move from the SECOND position toward the FIRST position, thereby causing the springs 162 to pull the conductive elements 150,160 out of engagement with the bus stabs 110,120. The method also includes the step of disengaging the branch circuit breakers 32 from the bus stabs 110,120 before the conductive elements 150,160 disengage the bus stabs 110,120 when the branch circuit breakers 32 move from the SECOND position toward the FIRST position.

Figure 7:
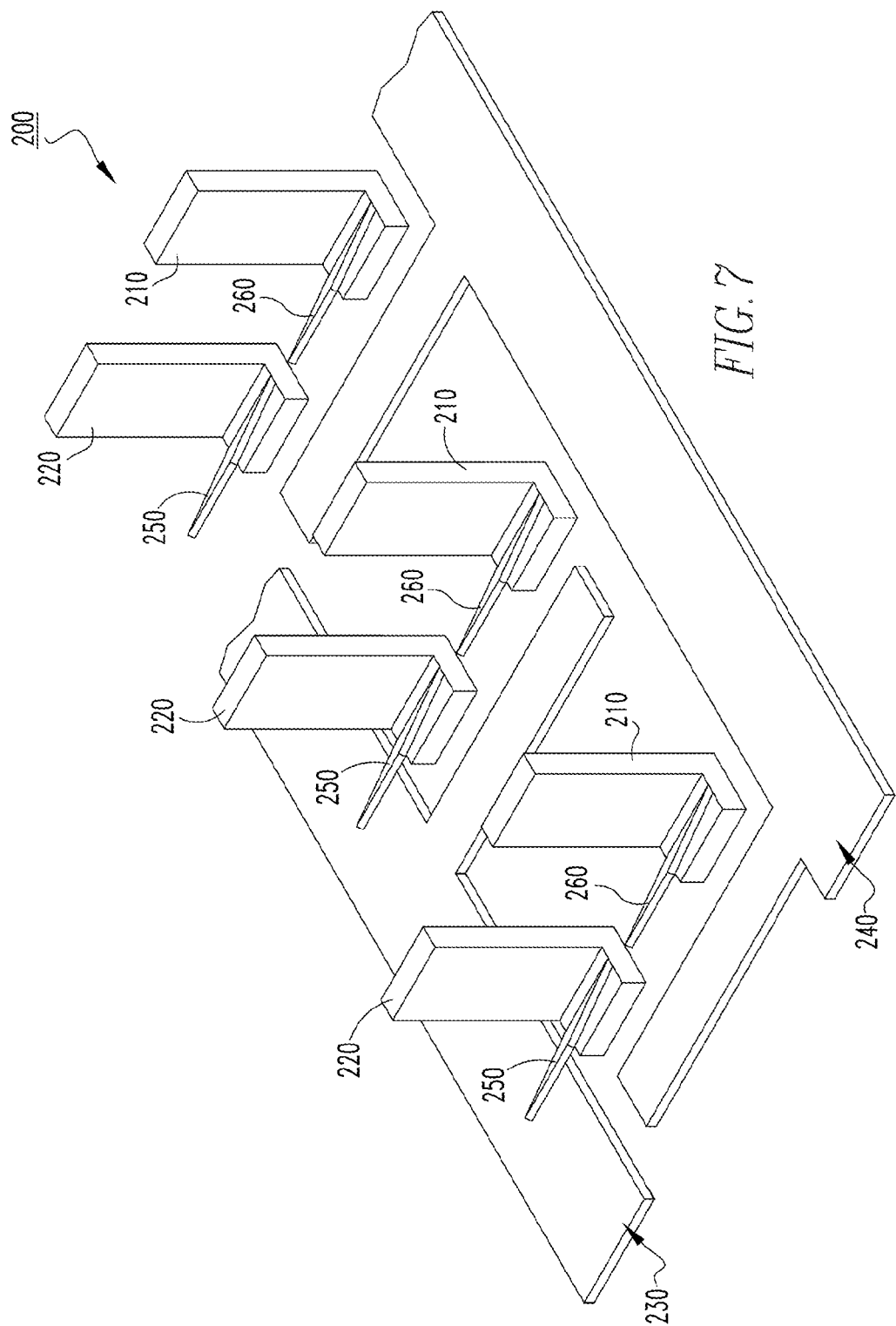
FIG. 7 is a simplified view of a portion of another bus assembly, in accordance with another non-limiting embodiment of the disclosed concept.

FIG. 7 shows a portion of another bus assembly 200 that may be substituted into the load center 2 in place of the bus assembly 100. The bus assembly 200 includes a number of bus stabs 210,220 and a number of bus bars 230,240 spaced from the bus stabs 210,220. Although the bus assembly 200 is structured similarly to the bus assembly 100, discussed hereinabove, the bus assembly 200 includes a number of conductive elements 250,260 that each extend from a corresponding one of the bus stabs 210,220. In one example embodiment, the conductive elements 250,260 and each of the respective bus stabs 210,220 are a single unitary component. It is also within the scope of the disclosed concept to have conductive elements (not shown) be separate components that are connected to the bus stabs by any known joining method (e.g., without limitation, welding). It will be understood that the bus assembly 200 functions substantially the same as and provides substantially the same advantages as the bus assembly 100. That is, the conductive elements 250,260 are structured to move between FIRST and SECOND positions corresponding to disengagement with the bus bars 230,240 and de-energized bus stabs 210,220, and engagement with the bus bars 230,240 and energized bus stabs 210,220, respectively.

It will be appreciated that the disclosed concept provides for an improved (e.g., without limitation, safer, and easier and less time consuming on which to perform maintenance) load center 2, and bus assembly 100,200 and operating method therefor, in which a number of bus stabs 110,120, 210,220 are advantageously able to be de-energized and energized when a corresponding number of electrical switching apparatus 32 are removed and installed, respectively.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A bus assembly for a load center, said load center comprising a cover apparatus and an electrical switching apparatus, said cover apparatus comprising a number of cover segments, said bus assembly comprising:
   a bus stab structured to be coupled to said number of cover segments and said electrical switching apparatus;
   a bus bar structured to be coupled to said number of cover segments; and
   a connection device comprising an element extending from a corresponding one of said bus stab and said bus bar,
   wherein said connection device is structured to move between a FIRST position corresponding to said element being electrically disconnected from the other of said corresponding one of said bus stab and said bus bar, and a SECOND position corresponding to said element being electrically connected to the other of said corresponding one of said bus stab and said bus bar, and
   wherein said bus stab is de-energized when said connection device is in the FIRST position and is energized when said connection device is in the SECOND position.

2. The bus assembly of claim 1 wherein said connection device further comprises a biasing member coupled to said element and structured to be coupled to a corresponding one of said cover segments; and wherein said biasing member biases said connection device toward the FIRST position.

3. The bus assembly of claim 1 wherein said element extends from said bus bar; wherein, when said connection device is in the SECOND position, said element engages said bus stab; and wherein, when said connection device is in the FIRST position, said element does not engage said bus stab.

4. The bus assembly of claim 1 wherein said element extends from said bus stab; wherein, when said connection device is in the SECOND position, said element engages said bus bar; and wherein, when said connection device is in the FIRST position, said element does not engage said bus bar.

5. The bus assembly of claim 1 wherein said element and said corresponding one of said bus stab and said bus bar are a single unitary component.

6. The bus assembly of claim 1 wherein said bus stab is spaced from said bus bar.

7. A load center comprising:
   a cover apparatus comprising a number of cover segments;
   at least one electrical switching apparatus; and
   a bus assembly comprising:
      at least one bus stab coupled to said number of cover segments and structured to be coupled to said at least one electrical switching apparatus,
      at least one bus bar coupled to said number of cover segments, and
      at least one connection device comprising an element extending from a corresponding one of said at least one bus stab and said at least one bus bar,
      wherein said at least one connection device is structured to move between a FIRST position corresponding to said element being electrically disconnected from the other of said corresponding one of said at least one bus stab and said at least one bus bar, and a SECOND position corresponding to said element being electrically connected to the other of said corresponding one of said at least one bus stab and said at least one bus bar, and
      wherein said at least one bus stab is de-energized when said at least one connection device is in the FIRST position and is energized when said at least one connection device is in the SECOND position.

8. The load center of claim 7 wherein said number of cover segments comprises at least one directing segment; wherein said at least one electrical switching apparatus is structured to move between a THIRD position corresponding to disengagement with said at least one bus stab, and a FOURTH position corresponding to engagement with said at least one bus stab; and wherein, when said at least one electrical switching apparatus moves from the THIRD position toward the FOURTH position, said at least one electrical switching apparatus pushes said at least one directing segment toward said element, thereby causing said at least one connection device to move from the FIRST position toward the SECOND position.

9. The load center of claim 8 wherein, when said at least one connection device is in the SECOND position, said element engages the other of said corresponding one of said at least one bus stab and said at least one bus bar; wherein, when said at least one connection device is in the FIRST position, said element does not engage the other of said corresponding one of said at least one bus stab and said at least one bus bar; and wherein, when said at least one electrical switching apparatus moves from the FOURTH position to the THIRD position, said element disengages the other of said corresponding one of said at least one bus stab and said at least one bus bar after said at least one electrical switching apparatus disengages said at least one bus stab.

10. The load center of claim 8 wherein, when said at least one connection device is in the SECOND position, said element engages the other of said corresponding one of said at least one bus stab and said at least one bus bar; wherein, when said at least one connection device is in the FIRST position, said element does not engage the other of said corresponding one of said at least one bus stab and said at least one bus bar; wherein, when said at least one electrical switching apparatus moves from the THIRD position to the FOURTH position, said element engages the other of said corresponding one of said at least one bus stab and said at least one bus bar before said at least one electrical switching apparatus engages said at least one bus stab.

11. The load center of claim 8 wherein said at least one connection device further comprises a biasing member coupled to said at least one directing segment and said element; and wherein said biasing member biases said at least one connection device toward the FIRST position.

12. The load center of claim 8 wherein said number of cover segments further comprises a first planar segment separating said at least one bus bar from said at least one electrical switching apparatus; wherein said at least one bus stab extends through said first planar segment; and wherein said at least one directing segment is slidably coupled to said first planar segment.

13. The load center of claim 12 wherein said number of cover segments further comprises a second planar segment and a third planar segment each coupled to said first planar segment; wherein said at least one bus stab comprises a first bus stab, a second bus stab, and a third bus stab; wherein said second planar segment is disposed between and separates said first bus stab from said second bus stab; and wherein said third planar segment is disposed between and separates said second bus stab from said third bus stab.

14. The load center of claim 13 wherein said number of cover segments further comprises a fourth planar segment, a fifth planar segment, and a sixth planar segment each coupled to said first planar segment, said second planar segment, and said third planar segment; wherein said at least one bus stab further comprises a fourth bus stab, a fifth bus stab, and a sixth bus stab; wherein said fourth planar segment is disposed between and separates said fourth bus stab from said fifth bus stab; wherein said fifth planar segment is disposed between and separates said fifth bus stab from said sixth bus stab; and wherein said sixth planar segment is disposed between and separates each of said first bus stab, said second bus stab, and said third bus stab from each of said fourth bus stab, said fifth bus stab, and said sixth bus stab.

15. The load center of claim 7 wherein said number of cover segments comprises a first planar segment, a second planar segment, a first plurality of other planar segments, and a second plurality of other planar segments; wherein said first planar segment is disposed between and separates said at least one bus bar from said at least one connection device; wherein said second planar segment is disposed perpendicular to said first planar segment; wherein said first plurality of other planar segments extends from said second planar segment in a first direction; wherein said second plurality of other planar segments extends from said second planar segment in a second direction opposite the first direction; and wherein said first planar segment, said second planar segment, said first plurality of other planar segments, and said second plurality of other planar segments are a single unitary component made from the same piece of material.

16. A method of operating a load center comprising a cover apparatus comprising a number of cover segments; at least one electrical switching apparatus; and a bus assembly comprising at least one bus stab coupled to said number of cover segments, at least one bus bar coupled to said number of cover segments, and at least one connection device comprising an element extending from a corresponding one of said at least one bus stab and said at least one bus bar, the method comprising the steps of:
    moving said at least one electrical switching apparatus between a FIRST position corresponding to disengagement with said at least one bus stab, and a SECOND position corresponding to engagement with said at least one bus stab; and
    either engaging said element with the other of said corresponding one of said at least one bus stab and said at least one bus bar when said at least one electrical switching apparatus moves from the FIRST position to the SECOND position, thereby energizing said at least one bus stab; or
    disengaging said element from the other of said corresponding one of said at least one bus stab and said at least one bus bar when said at least one electrical switching apparatus moves from the SECOND position to the FIRST position, thereby de-energizing said at least one bus stab.

17. The method of claim 16 wherein said number of cover segments comprises at least one directing segment; wherein said at least one connection device further comprises a biasing member coupled to said at least one directing segment and said element; and wherein the method further comprises:
    moving said at least one electrical switching apparatus into engagement with said at least one directing segment when said at least one electrical switching apparatus moves from the FIRST position toward the SECOND position, thereby causing said at least one directing segment and said biasing member to push said element into engagement with the other of said corresponding one of said at least one bus stab and said at least one bus bar.

18. The method of claim 17 further comprising the step of:
    moving said at least one electrical switching apparatus into engagement with said at least one bus stab after said element moves into engagement with the other of said corresponding one of said at least one bus stab and said at least one bus bar when said at least one electrical switching apparatus moves from the FIRST position toward the SECOND position.

19. The method of claim 16 wherein said number of cover segments comprises at least one directing segment; wherein said at least one connection device further comprises a biasing member coupled to said at least one directing segment and said element; wherein, when said at least one electrical switching apparatus is in the SECOND position, said at least one electrical switching apparatus engages said at least one directing segment; and wherein the method further comprises:

moving said at least one electrical switching apparatus out of engagement with said at least one directing segment when said at least one electrical switching apparatus moves from the SECOND position toward the FIRST position, thereby causing said biasing member to pull said element out of engagement with the other of said corresponding one of said at least one bus stab and said at least one bus bar.

20. The method of claim 19 further comprising the step of:
   disengaging said at least one electrical switching apparatus from said at least one bus stab before said element disengages the other of said corresponding one of said at least one bus stab and said at least one bus bar when said at least one electrical switching apparatus moves from the SECOND position toward the FIRST position.

* * * * *